United States Patent [19]

Brash

[11] Patent Number: 5,212,581
[45] Date of Patent: May 18, 1993

[54] MICROFILM SCANNING APPARATUS

[75] Inventor: Robert A. D. Brash, Winchester Hampshire, United Kingdom

[73] Assignee: Wicks and Wilson Limited, Basingstoke, Hants, England

[21] Appl. No.: 868,313

[22] Filed: Apr. 14, 1992

[30] Foreign Application Priority Data

Apr. 22, 1991 [GB] United Kingdom ............... 9108541

[51] Int. Cl.$^5$ .......................................... G02B 26/08
[52] U.S. Cl. .................................. 359/216; 359/218; 358/493
[58] Field of Search ............... 359/216, 217, 218, 219; 250/234, 235, 236; 358/493, 496

[56] References Cited

U.S. PATENT DOCUMENTS

| | | | |
|---|---|---|---|
| 3,122,052 | 2/1964 | Buck | 359/219 |
| 3,142,224 | 7/1964 | Andrews et al. | 359/219 |
| 3,174,153 | 3/1965 | Anderson | 359/219 |
| 3,474,459 | 10/1969 | Silverman | 359/219 |
| 3,520,586 | 7/1970 | Bousky | 359/219 |
| 3,778,129 | 12/1973 | Wildhaber | |
| 3,809,806 | 5/1974 | Walker et al. | 359/216 |
| 3,817,593 | 6/1974 | Harris et al. | 359/216 |
| 3,828,124 | 8/1974 | Baum | 359/216 |
| 4,268,110 | 5/1981 | Ford | 359/216 |

FOREIGN PATENT DOCUMENTS

| | | |
|---|---|---|
| 0213511 | 3/1987 | European Pat. Off. . |
| 1179800 | 1/1970 | United Kingdom . |
| 1198655 | 7/1970 | United Kingdom . |
| 1281405 | 7/1972 | United Kingdom . |
| 1427671 | 3/1976 | United Kingdom . |
| 1440892 | 6/1976 | United Kingdom . |
| 1453020 | 10/1976 | United Kingdom . |
| 2079487 | 1/1982 | United Kingdom . |
| 2179758 | 3/1987 | United Kingdom . |

Primary Examiner—Loha Ben
Attorney, Agent, or Firm—Ladas & Parry

[57] ABSTRACT

A microfilm scanning apparatus of the entrance scanner type has a microfilm, normally mounted in an aperture card which is mounted on a curved surface of a plano-convex cylindrical lens platten. The microfilm is scanned in one direction by radiant energy produced by a laser diode, scanning being effected by facets on a bevelled edge polygon mirror which is rotated by a motor. So as to perform scanning in a direction orthogonal to the scanning produced by the mirror, the platten is driven by a stepping motor. The curved surface of the platten is arranged to coincide with the loci of the focus of the scanning beam as the mirror rotates. By the provision of a curved surface platten, a simple spherical lens system may be interposed between the mirror and platten.

11 Claims, 1 Drawing Sheet

MICROFILM SCANNING APPARATUS

BACKGROUND OF THE INVENTION

1. Field of the Invention

This invention relates to a microfilm scanning apparatus, of the entrance scanner type which term is also intended to include within its scope a so-called plotting apparatus which modulates a writing beam as it is scanned across a light sensitive film.

2. Description of the Related Art

It is known that for the ease of handling and storage of microfilm that the microfilm is mounted in a card and that apertures are provided in the card in accordance with a predetermined code to facilitate retrieval of the microfilm in an automated file handling system. So as to view such a so-called microfilm aperture card, it is known to provide a laser beam scanning apparatus comprising a laser beam diode directing radiant energy to a bevelled edge (pyramid type) polygon mirror which is rotated by a motor. The polygon mirror has a plurality of flat face facets which redirect the laser beam through a flat field lens unit to focus the beam on the microfilm, the microfilm being located on a flat platten which is driven by a stepper motor. Thus, by rotating the polygonal mirror the microfilm is scanned by the laser beam in one direction and the stepper motor drives the microfilm orthogonally to the direction of laser beam scanning so that the microfilm surface is scanned in two mutually orthogonal directions. For example, the laser beam scans the microfilm in the X direction and the stepper motor moves the microfilm in the Y direction.

However, because the microfilm is located on a flat platten, an expensive flat field lens unit is required to correct the focus of the laser beam in the direction of scanning (that is in the aforementioned X direction) since the beam is scanned in a curved path onto a flat surface.

The provision of such a flat field lens, which is expensive to manufacture, leads to a complex and expensive scanning apparatus and it is an object of this invention to provide a microfilm scanning apparatus having improved optical features which is less expensive to produce.

SUMMARY OF THE INVENTION

According to this invention there is provided a microfilm scanning apparatus including radiant energy producing means, a rotatable polygon mirror for receiving and scanning the radiant energy across a microfilm, a platten having an arcuate surface for supporting the microfilm thereon, the arcuate surface coinciding with the loci of the focus of the scanning radiant energy.

Preferably, the platten is in the form of a plano-convex lens, the plane side of the platten being located adjacent the polygon mirror. Advantageously, the platten is made from transparent plastics.

Conveniently, the radiant energy producing means is a laser diode and, advantageously, a collimator and beam expander is located between the laser diode and the polygon mirror.

Advantageously, the polygon mirror has a bevelled edge for redirecting the radiant energy and the angle through which the radiant energy is redirected is, in the currently preferred embodiment, substantially 90°.

Although the polygon mirror may have any suitable plurality of facets for redirecting the radiant energy, in the preferred embodiment the mirror is hexagonal.

Advantageously, the polygon mirror is arranged to be driven by a motor at a speed of approximately 10,000 r.p.m.

Advantageously, a channel is formed in the platten to be operatively underneath the microfilm, and vacuum producing means is coupled to the channel whereby the microfilm is held, in operation, in close proximity to the arcuate surface by a vacuum created by the vacuum producing means.

Conveniently, the platten is connected to be driven by a stepper motor in a direction substantially orthogonal to the direction of scanning by the radiant energy on the microfilm so that the whole of an image on the microfilm may be scanned.

So as to substantially reduce chromatic aberration, advantageously two or more spherical lenses are provided between the mirror and the platten as a scan lens unit.

BRIEF DESCRIPTION OF THE DRAWINGS

The invention will now be described, by way of example, with reference to the accompanying drawings in which.

In the Figures like reference numerals denote like parts.

DESCRIPTION OF THE PREFERRED EMBODIMENTS

Figure 1:
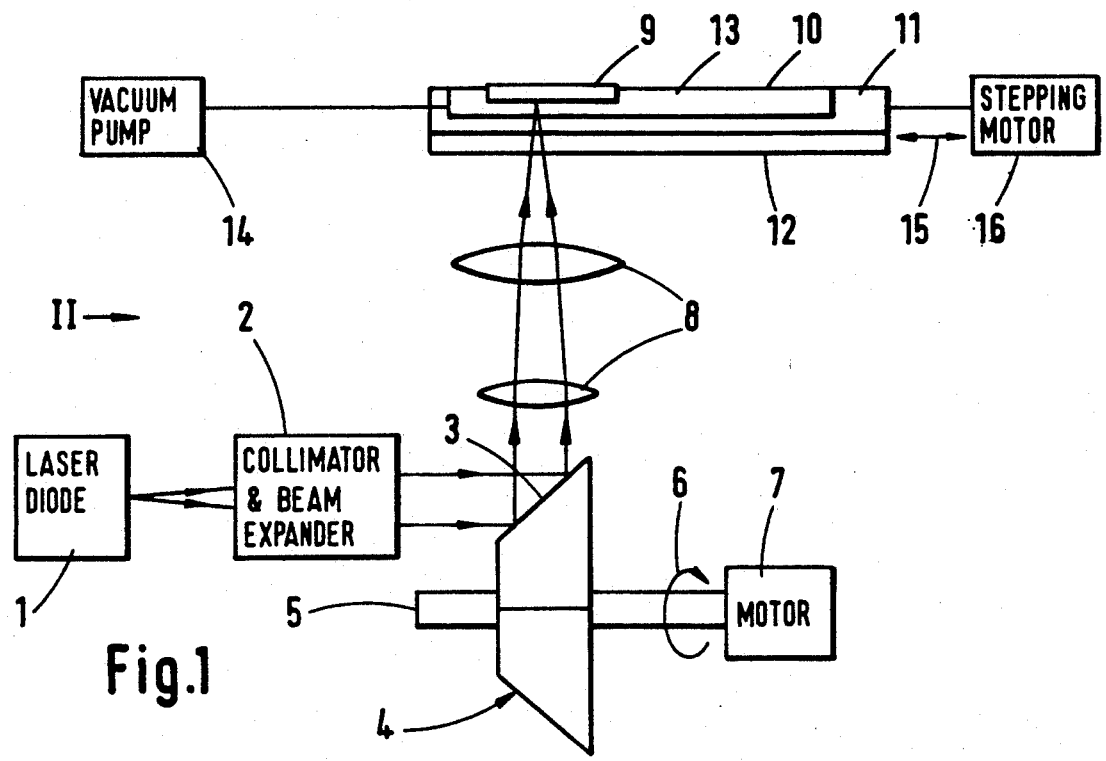
FIG. 1 shows a schematic side elevational view of a microfilm scanning apparatus in accordance with this invention.
Figure 2:
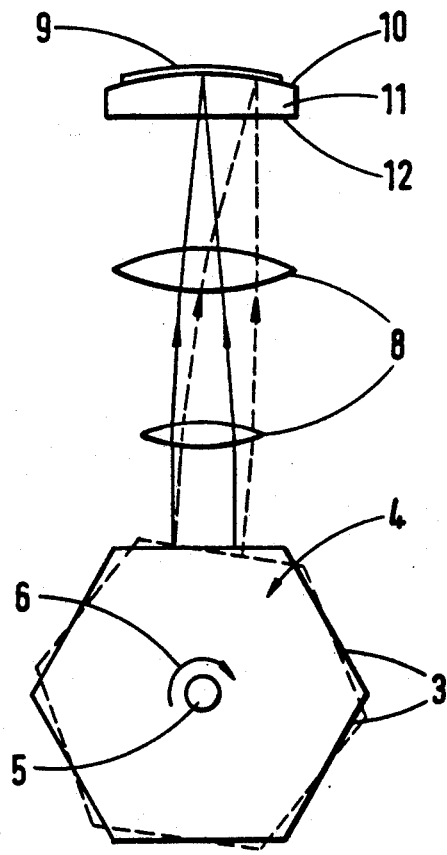
FIG. 2 shows a schematic end elevation in the direction of arrow-headed line II.

The microfilm scanning apparatus shown in FIGS. 1 and 2 has a laser beam diode 1 projecting a beam of radiant energy via a collimator and beam expander 2 onto a bevelled edge 3 of a 45° bevelled edge (pyramid type) polygon mirror 4 which is hexagonal in shape, the bevelled edge 3 thus being one of six facets of the mirror 4. The mirror 4 is mounted on a shaft 5 located within journals (not shown) and the shaft 5 is rotated in the direction of arrow-headed line 6 by a motor 7. The motor is arranged to drive the shaft at about 10,000 r.p.m.

Radiant energy from the collimator and beam expander is substantially parallel upon striking the facets 3 of the mirror and the energy upon being reflected substantially orthogonally from the facets is also substantially parallel. The reflected radiant energy is focussed by a lens system 8 formed by at least two lenses for overcoming chromatic aberration but, unlike the prior art in the present invention, the lenses 8 may be simple spherical lenses. The radiant energy is focussed onto a microfilm 9 mounted in an aperture card and the combination of microfilm and aperture card is supported on an arcuate surface 10 of a platten 11. The platten is in the form of a plano-convex cylindrical lens such that the plane surface 12 of the platten is adjacent the mirror 4. The platten may be considered part of the optical system and its arcuate surface 10 is chosen so that it coincides with the loci of the focus of the radiant energy beam as the polygon mirror is rotated.

A vacuum channel 13 is machined into the arcuate surface 10 of the platten and the channel is connected via a manifold system and flexible tube to a vacuum producing pump 14 so that the microfilm may be held in close proximity to the arcuate surface 10 and to thereby ensure that the microfilm is always in the plane of focus of the radiant energy beam.

The platten 11 is arranged to be driven in the direction of double arrow-headed line 15 which is orthogonal to the direction of scanning of the radiant energy beam by a stepping motor 16.

The scanning by the radiant energy beam is shown in FIG. 2 wherein the mirror is shown in two positions rotated from one another, one position being shown in solid line with the radiant energy also being shown in solid line, and the other position being shown in broken lines with the radiant energy produced thereby being shown in broken lines. It will, therefore, be seen from FIG. 2 that the radiant energy is scanned across the microfilm and that the loci of the focus of the laser beam lies in the plane of the microfilm as a result of the curvature of the platten 11.

By the provision of a polygon mirror several scans of the microfilm are performed per complete rotation of the mirror. Thus, in this present instance, six scans are provided per rotation of the mirror and at the completion of each scan the stepper motor 16 increments the position of the microfilm.

Thus, by the use of the present invention, a microfilm scanning apparatus is produced which avoids normally provided complex and expensive flat field lenses which are aspheric and simple spherical lenses may be provided between the mirror and platten.

Although the present invention has been described in relation to the use of a laser diode, other forms of radiant energy may be provided and, similarly, the rotational speed of the number of facets and rotational speed of the mirror may be altered to suit requirements.

It is to be understood that the invention has been described with reference to exemplary embodiments, and modifications may be made without departing from the spirit and scope of the invention as defined in the appended claims.

I claim:

1. A microfilm scanning apparatus of the entrance scanner type including radiant energy producing means, a rotatable polygon mirror for receiving a radiant energy from the producing means and scanning said radiant energy across a microfilm, a platten having an arcuate surface for supporting said microfilm thereon, said arcuate surface coinciding with the loci of the focus of the scanning radiant energy, and said platten being in the form of a plano-convex lens, the plane side of the platten being located adjacent the polygon mirror.

2. An apparatus as claimed in claim 1 wherein the radiant energy producing means is a laser diode.

3. An apparatus as claimed in claim 2 wherein a collimator and beam expander is located between the laser diode and the polygon mirror.

4. An apparatus as claimed in claim 1 wherein the polygon mirror has a bevelled edge for redirecting the radiant energy.

5. An apparatus as claimed in claim 4 wherein said bevelled edge is shaped so that the angel through which the radiant energy is redirected is substantially 90°.

6. An apparatus as claimed in claim 1 wherein the mirror is hexagonal.

7. An apparatus as claimed in claim 1 wherein the polygon mirror is drivable by a motor at a speed of approximately 10,000 r.p.m.

8. An apparatus as claimed in claim 1 wherein a channel is formed in said platten to be underneath the microfilm, and vacuum producing means is coupled to said channel whereby said microfilm is held in close proximity to said arcuate surface by said vacuum producing means.

9. An apparatus as claimed in claim 10 wherein the platten is made from transparent plastics.

10. An apparatus as claimed in claim 1 wherein the platten is connected to be driven by a stepper motor in a direction substantially orthogonal to the direction of scanning by the radiant energy on the microfilm so that the whole of an image on the microfilm may be scanned.

11. An apparatus as claimed in claim 1 wherein a scan lens unit formed by two or more spherical lenses is provided between the mirror and the platten.

* * * * *